United States Patent
Karem

(10) Patent No.: US 11,136,941 B2
(45) Date of Patent: Oct. 5, 2021

(54) DEVICES AND METHODS FOR EXHAUST VECTORING IN TILT ROTOR AIRCRAFT

(71) Applicant: Abe Karem, Tustin, CA (US)

(72) Inventor: Abe Karem, Tustin, CA (US)

(*) Notice: Subject to any disclaimer, the term of this patent is extended or adjusted under 35 U.S.C. 154(b) by 356 days.

(21) Appl. No.: 16/186,139

(22) Filed: Nov. 9, 2018

(65) Prior Publication Data

US 2019/0135429 A1 May 9, 2019

Related U.S. Application Data

(60) Provisional application No. 62/583,892, filed on Nov. 9, 2017.

(51) Int. Cl.

| *F02K 1/80* | (2006.01) |
|---|---|
| *B64D 33/04* | (2006.01) |
| *F02K 1/00* | (2006.01) |
| *B64C 15/02* | (2006.01) |
| *B64C 29/00* | (2006.01) |
| *F02K 1/04* | (2006.01) |

(52) U.S. Cl.
CPC .............. *F02K 1/80* (2013.01); *B64C 15/02* (2013.01); *B64C 29/0033* (2013.01); *B64D 33/04* (2013.01); *F02K 1/002* (2013.01); *F02K 1/006* (2013.01); *F02K 1/04* (2013.01); *F05D 2220/323* (2013.01); *F05D 2220/90* (2013.01); *F05D 2300/121* (2013.01); *F05D 2300/125* (2013.01); *F05D 2300/133* (2013.01); *F05D 2300/171* (2013.01)

(58) Field of Classification Search
CPC ......... B64C 15/00; B64C 15/02; B64C 15/12; B64C 15/14; B64C 29/0033; B64C 29/0075; B64D 33/04; F02K 1/04; F02K 1/002; F02K 1/006; F02K 1/80

See application file for complete search history.

(56) References Cited

U.S. PATENT DOCUMENTS

| 3,180,087 A | | 4/1965 | Marchant | |
|---|---|---|---|---|
| 3,429,509 A | * | 2/1969 | Markowski | ............. F02K 1/004 239/127.3 |
| 3,434,289 A | * | 3/1969 | Vedova | ..................... F23R 3/28 60/232 |
| 3,441,220 A | * | 4/1969 | Wildner | .................. F02K 1/004 239/265.35 |
| 3,443,758 A | * | 5/1969 | Kopp | ...................... F02K 1/004 239/265.35 |
| 3,525,475 A | * | 8/1970 | Schweikl | ................ F02K 1/004 239/265.35 |
| 3,687,374 A | * | 8/1972 | Nash | ....................... F02K 1/004 239/265.35 |

(Continued)

FOREIGN PATENT DOCUMENTS

| EP | 2778063 | | 9/2014 | |
|---|---|---|---|---|
| FR | 1497900 A | * | 10/1967 | ............. F02K 1/004 |

*Primary Examiner* — Joshua J Michener
*Assistant Examiner* — Arfan Y. Sinaki
(74) *Attorney, Agent, or Firm* — Fish IP Law, LLP

(57) ABSTRACT

Exhaust redirecting devices are described that are suitable for use in tilt rotor aircraft. Such devices are constructed of light weight material and permit redirection of exhaust gases from turbojet engines of tilt rotor aircraft as nacelles of the aircraft transition between vertical and horizontal flight. Use of a controller permits coordination between exhaust redirection and nacelle position.

9 Claims, 11 Drawing Sheets

(56) References Cited

U.S. PATENT DOCUMENTS

| | | | | |
|---|---|---|---|---|
| 3,776,467 | A * | 12/1973 | Riemerschmid | F02K 1/004 239/265.35 |
| 3,972,490 | A | 8/1976 | Zimmermann et al. | |
| 3,989,193 | A * | 11/1976 | Vedova | F02K 1/1207 239/265.35 |
| 4,709,880 | A | 12/1987 | Bradfield et al. | |
| 4,913,354 | A * | 4/1990 | Woodward | F02K 1/004 239/265.35 |
| 5,011,195 | A * | 4/1991 | Nightingale | B60T 17/043 285/302 |
| 5,141,159 | A * | 8/1992 | Langley | F02K 1/004 239/265.35 |
| 5,478,016 | A * | 12/1995 | Mansfield | F02K 1/004 239/265.19 |
| 5,797,544 | A * | 8/1998 | Ward | F02K 1/1223 239/265.37 |
| 6,296,378 | B1 * | 10/2001 | Doyen | B64C 27/52 362/390 |
| 7,802,754 | B2 | 9/2010 | Karem | |
| 8,083,172 | B2 | 12/2011 | Karem | |
| 8,864,062 | B2 | 10/2014 | Karem | |
| 2014/0084080 | A1 * | 3/2014 | Robertson | B64D 33/06 239/127.3 |
| 2014/0252158 | A1 | 9/2014 | Schaeffer | |
| 2016/0304196 | A1 * | 10/2016 | Alber | B64C 27/12 |
| 2016/0333797 | A1 * | 11/2016 | Laramee | B64D 33/04 |
| 2018/0251227 | A1 * | 9/2018 | Ross | B64C 7/02 |
| 2018/0354616 | A1 * | 12/2018 | Groninga | B64D 33/02 |
| 2018/0362180 | A1 * | 12/2018 | Ross | B64D 35/02 |
| 2019/0031371 | A1 * | 1/2019 | Ross | B64C 29/0033 |

\* cited by examiner

DEVICES AND METHODS FOR EXHAUST VECTORING IN TILT ROTOR AIRCRAFT

This application claims priority to U.S. Provisional Patent Application No. 62/583,892, filed on Nov. 9, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is tilt rotor aircraft.

BACKGROUND

The following description includes information that may be useful in understanding the present invention. It is not an admission that any of the information provided herein is prior art or relevant to the presently claimed invention, or that any publication specifically or implicitly referenced is prior art.

All tilt rotor aircraft face the challenge of providing sufficient vertical thrust to support vertical takeoff and landing without presenting impediments to horizontal flight and the transition to horizontal flight. While additional thrust can be provided using larger rotors and/or engines or motors of higher output, both of these come at the expense of increased weight and complexity.

Tilt rotor aircraft designs have adopted various strategies to accommodate both vertical and horizontal flight, and the transition between the two. For example, FIG. 1 is a photograph of a prior art V-22 tilt rotor aircraft, where entire nacelles, which includes rotors, turbine engine, and a gearbox connecting the engine to the rotor, are tilted between vertical and horizontal positions. FIG. 2 is a photograph of a different prior art Leonardo AW609 tilt rotor aircraft that also utilizes the complete tilting nacelles that include a rotor, turbine engine, and a gearbox connecting the engine to the rotor. Such designs, however, require a complex and robust system for tilting these heavy nacelle assemblies, adding both weight and complexity to the aircraft.

Other tilt rotor aircraft designs have attempted to address these issues by tilting only the rotor, for example by tilting a portion of a nacelle that includes the rotor while leaving the turbine engine in place. An example of such a design is shown in FIG. 3, which provides a photograph of a prior art Bell V-280. This is a relatively recent design, scheduled for first flight 1 in late 2017. As shown, the non-tilting engine is provided with an articulated gearbox, which is in turn coupled to a tilting front rotor drive section and aft section adjacent to the engine. A similar prior art design is shown in FIG. 4, which provides a photograph of a prior art Leonardo Clean Sky 2 Next Generation Civil Tilt rotor (NextGenCTR) aircraft. As shown this design also features a non-tilting engine with an articulated gearbox coupled to a tilting front rotor drive section and aft section adjacent to the engine.

FIG. 3 and FIG. 4 are illustrative of a new tilt rotor technological trend in the United States and in Western Europe that strongly favors non-tilting engines positioned outboard of the rotor center with side inlet instead of the traditional bottom inlet. These designs seek to avoid the disadvantages of exhaust jet impact on the ground for both military applications and commercial applications of tilt rotor aircraft. Such configurations, however, have the following a number of disadvantages. Such designs utilize high-power high-speed spiral bevel gears, which in aircraft applications require very low failure rates. Such application becomes very challenging as the aircraft is to be scaled up from the current 30,000 Lb Maximum Take-Off Weight (MTOW). In addition oil sealing is required for the articulated gearbox, where oil leaks present a fire hazard. The side inlets utilized are less efficient than bottom inlet, especially at positive angle of attack. Such designs provide a less compact width dimension if folded for stowage with rotor tilted up (e.g. on deck of a ship). In addition, such designs result in a large aft shift of the center of gravity of the propulsion nacelle (rotor and the tilting section of the gearbox) when tilting the rotor from cruise to hover, without the balancing effect of the engine weight moving forward. Finally, if aircraft using such designs are equipped with a tilting outboard wing (such as in U.S. Pat. No. 7,802,754 B2), to provide both the high cruise efficiency of a long span wing and the low hover download, it makes the simplicity and reduced weight by application of combination spar and trunnion structure (as in U.S. Pat. No. 8,083,172 B2) virtually unavailable. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The tilting outboard wing has a critically important contribution to achieving cruise efficiency in a tilt rotor aircraft, lift/drag ratio ranging between 26:1 and 40:1 (as in U.S. Pat. No. 8,864,062 B2) compared to approximately 6:1 of the V-22 aircraft shown in FIG. 1. Such an outboard wing is therefore important for tilt rotors to achieve the range and economic viability (cost per ton-mile or seat-mile) of the best fixed-wing aircraft.

Thrust vectoring of the output of jet engines has been applied to jet aircraft in order to provide vertical thrust. However, deflecting the exhaust jet in tilt rotor aircraft is not considered an acceptable design approach due to the perceived complexity and weight penalty imposed by such devices.

Thus, there is still a need for an exhaust deflection device for a tilt rotor aircraft.

SUMMARY OF THE INVENTION

The inventive subject matter provides apparatus, systems and methods in which light weight exhaust directing devices permit redirection of exhaust gases from turbojet engines of tilt rotor aircraft as nacelles of the aircraft transition between vertical and horizontal flight.

In some embodiments, the exhaust directing device has an exhaust inlet portion in fluidic communication with an exhaust stream of the tilt rotor aircraft, an outlet portion coupled to a nozzle assembly, and an intermediate portion interposed between the exhaust inlet portion and the outlet portion. The intermediate portion is slidably and fluidically coupled to the exhaust outlet portion by a first interface and the intermediate portion is slidably and fluidically coupled to the outlet portion by a second interface. In addition the exhaust directing device has a first position in which the exhaust inlet portion, the intermediate portion, and the outlet portion are in a linear arrangement, and wherein the exhaust directing device has a second position in which the exhaust inlet portion and the outlet portion are angled relative to one another. In some embodiments the first interface and the second interface are not in a perpendicular orientation relative to a long axis of the exhaust directing device when the exhaust directing device is in the first position. The exhaust inlet portion can include a first long wall portion and a first short wall portion, the outlet portion comprises a second long wall portion and a second short wall portion, and the intermediate portion comprises a first exposed surface interposed between the first long wall and the second long wall and a second exposed surface interposed between the first short wall and the second short wall. The first exposed surface is less than that of the second exposed surface when the exhaust directing device is in the first position, and is greater than that of the second exposed surface when the exhaust directing device is in the second position. The exhaust inlet portion can include a coupling configured to provide fluid communication with the exhaust stream of the tilt rotor aircraft. Portions of the exhaust directing device exposed to the exhaust stream are comprised of a light weight material, such as a composite material, aluminum, magnesium, titanium, steel, and combinations of these, and can be relatively thin (e.g. between 0.25 cm and 5 cm) It is further contemplated that the thickness can be as thin as 0.1 cm, at least in some portions.

Another embodiment of the inventive concept is system for directing exhaust from a tilt rotor aircraft. Such a system can include an exhaust directing device as described above, along with a driver that is designed and positioned to translate or rotate at least one of the exhaust inlet portion, the intermediate portion, and the outlet portion so as to transition the exhaust directing device between the first position and the second position. Such a system can also include a controller that is in electrical communication with the driver and that coordinates transition of the exhaust directing device between the first position and the second position with transition of the tilt rotor aircraft between vertical and horizontal flight. In some embodiments the driver is designed and positioned to rotate at least one of the exhaust inlet portion, the intermediate portion, and the outlet portion of the exhaust directing device relative to the major axis of the exhaust directing device when in the first position. In other embodiments the driver is designed and positioned to translate at least a portion of one of the exhaust inlet portion and the outlet portion of the exhaust directing device relative to the intermediate portion. Suitable drivers include motors and linear actuators (such as a linear motor, a hydraulic actuator, and a pneumatic actuator).

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 6A and 6D depict a view along the long axis of an exhaust directing device of the inventive concept from the exhaust outlet, showing both a straight or linear (FIG. 6A) and angled or deflecting (FIG. 6D) position.
FIG. 6B and 6E show side views of the exhaust directing device depicted in FIGS. 6A and 6D, and similarly show straight or linear (FIG. 6B) and angled or deflecting (FIG. 6E) configurations.
FIGS. 6C and 6F show perspective views of the exhaust directing device depicted in FIGS. 6B and 6E, and similarly show straight or linear (FIG. 6C) and angled or deflecting (FIG. 6F) positions.

FIG. 7A shows an tilt rotor aircraft in vertical flight, with exhaust from the tilted nacelles directed essentially horizontally while the nacelles are oriented vertically. FIG. 7B provides an enlarged view of a nacelle from the aircraft configuration shown in FIG. 7A. FIG. 7C provides a view from beneath a tilt rotor aircraft in horizontal flight, with both nacelles and exhaust from the nacelles directed essentially horizontally. FIG. 7D provides a view from above the aircraft shown in FIG. 7C.

DETAILED DESCRIPTION

Devices and systems of the inventive concept provide mechanisms for directing the flow of exhaust gases from engines utilized in tilt rotor aircraft. For example, exhaust gases can be directed to flow in a consistent direction (e.g. towards the rear of the aircraft) as a nacelle that includes the exhaust-producing engine is rotated (e.g. during transition between vertical and horizontal flight). A controller can be provided that coordinates redirection of the exhaust stream with movement of the associated nacelle and/or aircraft transition status.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
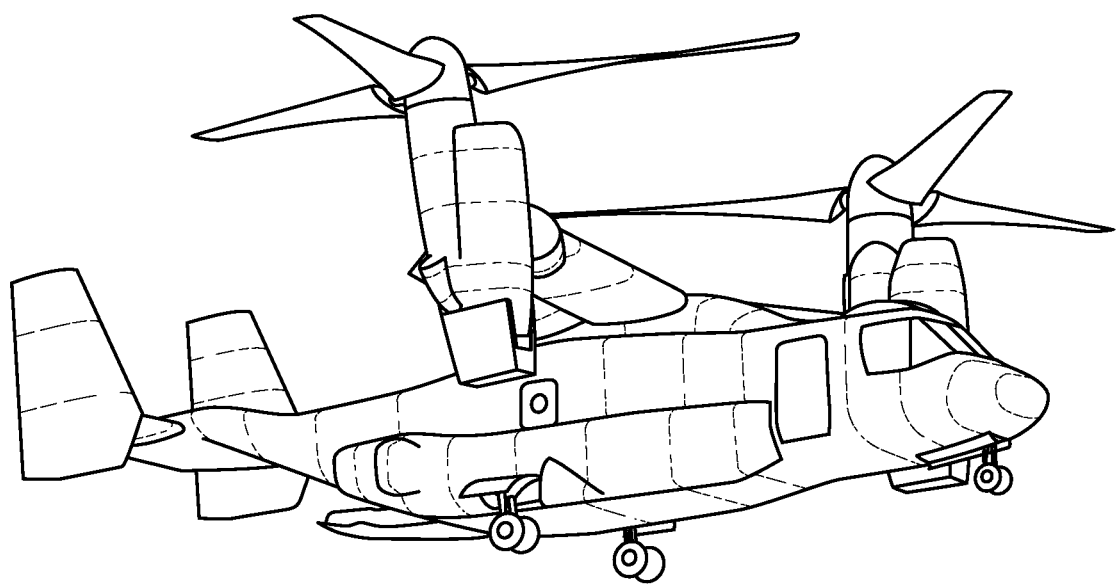
FIG. 1 depicts a prior art V-22 tilt rotor aircraft.
Figure 2:
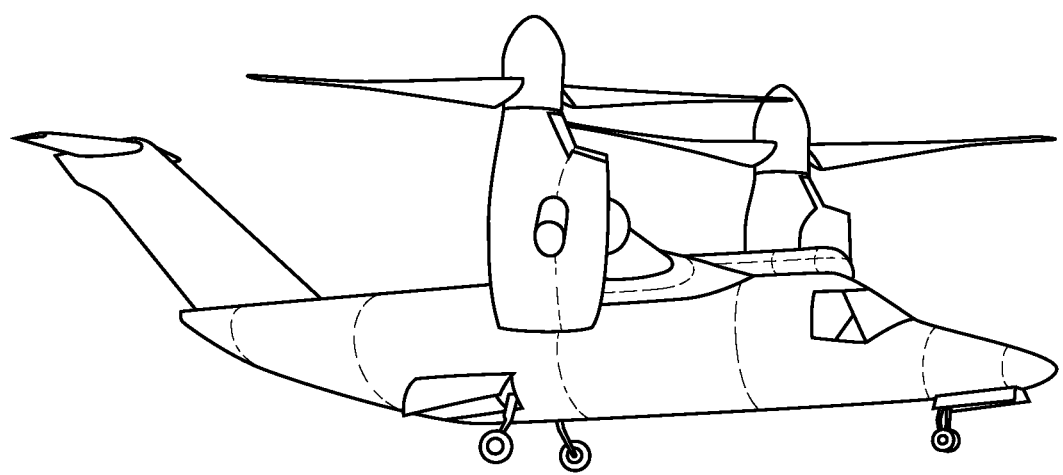
FIG. 2 depicts a prior art Leonardo AW609 tilt rotor aircraft.
Figure 3:
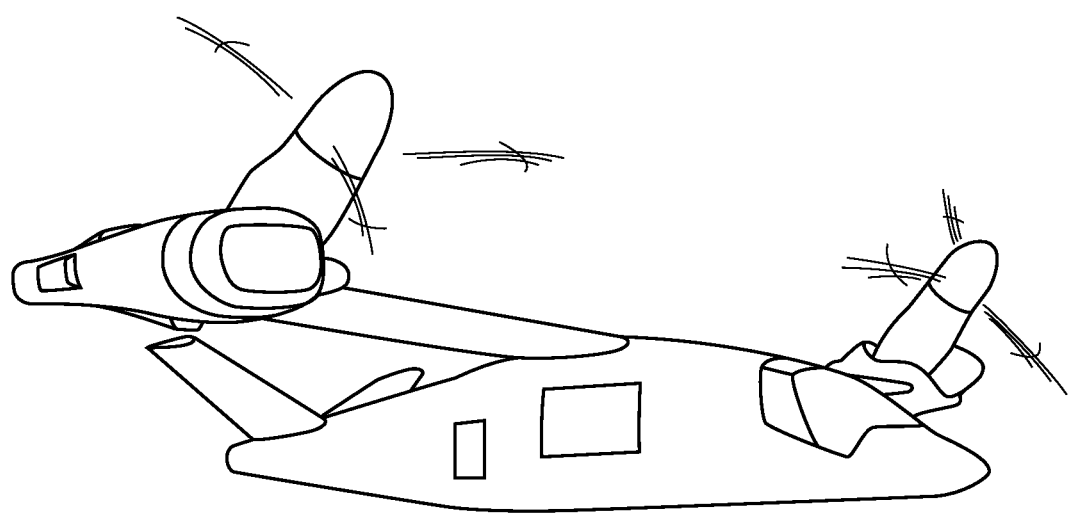
FIG. 3 depicts a prior art Bell V-280 aircraft.
Figure 4:
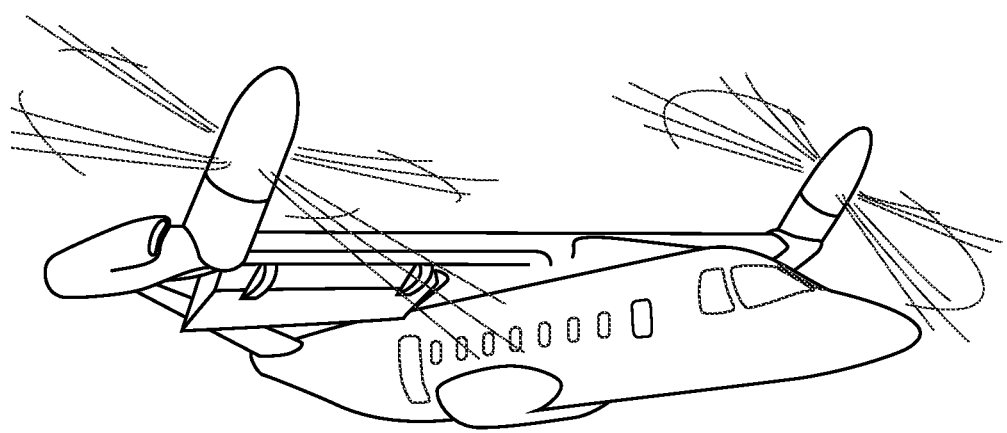
FIG. 4 depicts a prior art Leonardo Clean Sky 2 Next Generation Civil Tilt rotor.
Figure 5:
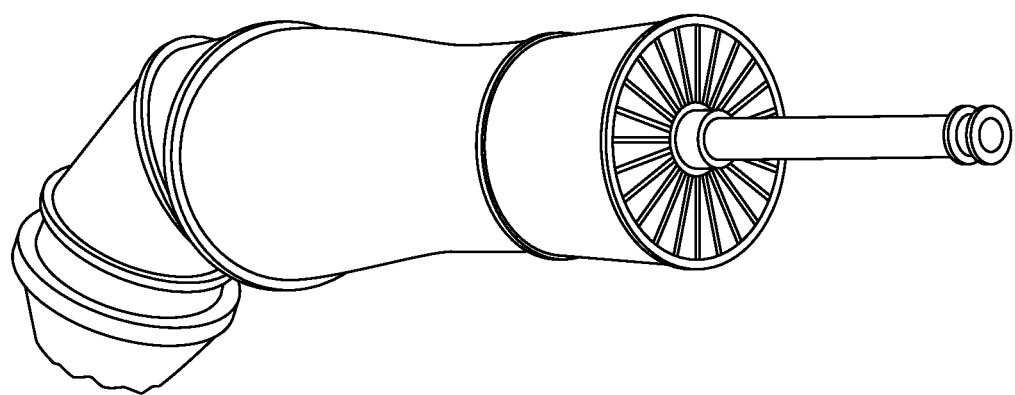
FIG. 5 depicts an exhaust directing device coupled to an engine assembly of an F-35B jet stealth fighter.

It should be appreciated that devices for directing jet engine output have been explored, for example for use in thrust vectoring in vertical takeoff and landing jet aircraft. Such devices have been considered impractical for use in tilt rotor aircraft due to their complexity and weight. Inventors have considered, however, that conventional practice does not take into consideration the very low temperature and total energy of the jet engine typically utilized in a tilt rotor aircraft. In order to achieve maximum hover weight a turbine powered rotorcraft extracts the maximum energy from the core engine via the power turbine and transfers this power to a rotor, which provides very high ratio of lift to power compared to the engine's exhaust jet. As a result the exhaust jet of a rotorcraft turboshaft engine is characterized by low energy and temperature. FIG. 5 is a photograph of the tilting engine exhaust apparatus of an F-35B stealth jet aircraft, showing the typical complex and robust design required by high operating temperatures and pressures. Compared to deflecting 18,000 Lb vertical exhaust thrust of the F-135 supporting a 36,000 Lb F-35B, the exhaust thrust of a turboshaft engine of a typical tilt rotor aircraft of the same hover weight is only 150 Lb. Exemplary exhaust jet data from a typical rotorcraft turboshaft engine providing 2,500 HP Maximum Rated Power (MRP) at Sea Level Standard (SLS) conditions is shown in Table 1.

TABLE 1

| Altitude (ft) | Temperature at Altitude (° F.) | Approximate Thrust (Lb) | Approximate Exhaust Temperature (° F.) | Approximate Exhaust Velocity (ft/s) |
|---|---|---|---|---|
| 0 | 59 | 150 | 1,100 | 350 |

The 13 Lb/sec mass flow and 1,100° F. temperature relieve many of the design constraints imposed on prior art exhaust redirecting systems and permit the implementation of light weight tilting tail pipes for exhaust deflection and/or redirection.

Exhaust deflection and/or redirecting devices of the inventive concept are light weight, compact, and mechanically simple, providing placemen within a nacelle of a tilt rotor aircraft without impacting contour or significantly impacting aircraft weight. Such devices can be utilized to maintain the flow of exhaust gases towards the rear of a tilt rotor aircraft during both vertical and horizontal flight. Alternatively, such devices can be used to direct flow of an exhaust stream so as to provide a degree of supplemental thrust for maneuvering and/or hovering operations.

Figure 6A:
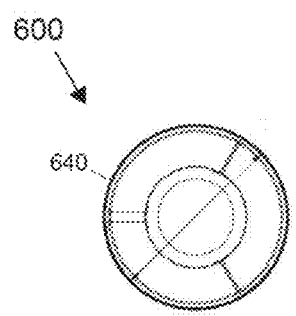
FIGS. 6A to 6F depict views an exhaust directing device of the inventive concept, in linear and angled configuration.
Figure 6B:
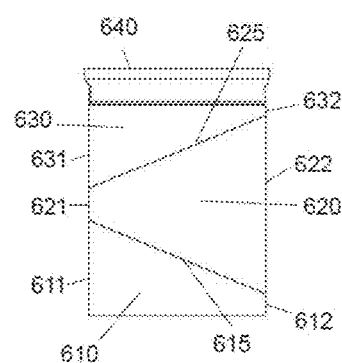
Figure 6C:
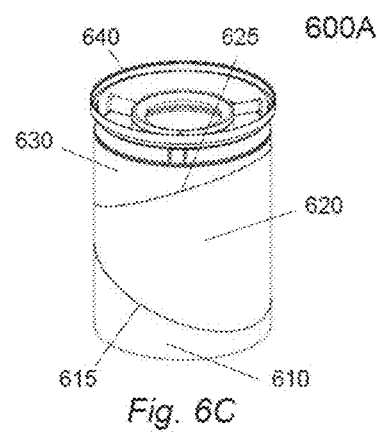
Figure 6D:
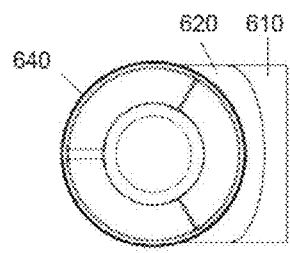
Figure 6E:
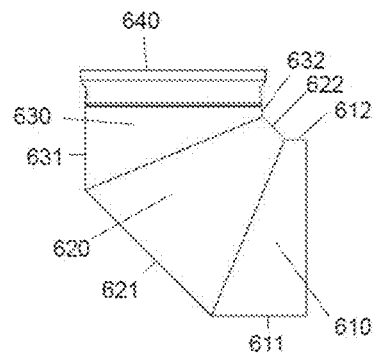
Figure 6F:
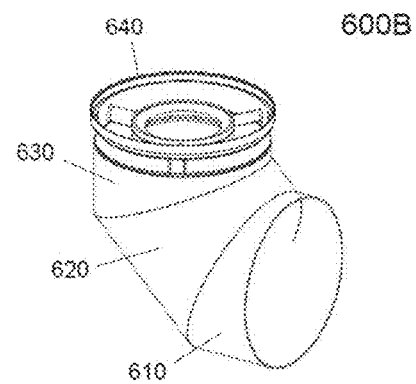

As shown in FIGS. 6A to 6F, devices of the inventive concept can be provided as a multisegment tube that includes an exit nozzle and an interface for coupling to the exhaust stream of the aircraft's jet engine. Since the engine's exhaust is not extremely hot or energetic relatively lightweight materials can be used. For example, all or part of the device (for example, portions exposed to the exhaust gases) can be made of composite materials and/or light weight metals (aluminum, magnesium, titanium, steel, etc.). Similarly, such materials can be provided in relatively small thicknesses (e.g. about 0.5 cm, 1 cm, 1.5 cm, 2 cm. 2.5 cm, 3 cm, 4 cm, 5 cm, and ranges between these values). FIGS. 6A and 6D provide views from an exhaust nozzle 640 end of an exemplary exhaust redirecting device 600 of the inventive concept, in a straight (600A) configuration (FIG. 6A) and in an angled or bent (600B) configuration (FIG. 6D). FIGS. 6B and 6E provide side views of an exemplary exhaust redirecting device 600 of the inventive concept, in a straight (600A) configuration (FIG. 6B) and in an angled or bent (600B) configuration (FIG. 6E). FIGS. 6C and 6F provide perspective views of an exemplary exhaust redirecting device 600 of the inventive concept, in a straight (600A) configuration (FIG. 6C) and in an angled or bent (600B) configuration (FIG. 6F). In general, an exhaust directing device 600 has an exhaust inlet portion 610 that is in communication with and receives an exhaust stream from the tilt rotor aircraft. A terminal outlet portion 630 of the device can include a nozzle assembly 640. These components are joined by an intermediate portion 620 using a sleeve, seal, joint, or other interface that supports translational/sliding motions and/or rotary motions between the segments. The segments are shaped so that they can be arranged so as to provide a conventional, straight configuration (600A), however on reposition a bend or angle is introduced between the exhaust inlet portion and the outlet portion that generates a second position (600B) in which the flow of exhaust is re-directed. For example, the inlet 610 and outlet 630 portions can be essentially triangular (e.g. having both long walls (611, 631) and short walls (612, 632)), while the intermediate portion 620 can be essentially cylindrical or trapezoidal, which can result in interfaces (615, 625) that are oblique angles relative to the long axis of the device in its extended (straight) configuration (600A).

In preferred embodiments, the exhaust inlet portion (610) comprises a first long wall portion (611) and a first short wall portion (612), the outlet portion (630) comprises a second long wall portion (631) and a second short wall portion (632), and the intermediate portion (620) comprises a first exposed surface (621) interposed between the first long wall (611) and the second long wall (631) and a second exposed surface (622) interposed between the first short wall (612) and the second short wall (632). Preferably, the area of the first exposed surface (621) is less than that of the second exposed surface (622) when the exhaust directing device (600) is in the first position (600A), and the area of the first exposed surface (621) is greater than that of the second exposed surface (622) when the exhaust directing device (600) is in the second position (600B). It is contemplated that the exhaust inlet portion (610) comprises a coupling configured to provide fluid communication with the exhaust stream of the tilt rotor aircraft.

In such embodiments arrangement of the short walls of the terminal segments or portions of the device near each other by translation or rotation of one or more segments can provide an extended or straight configuration. Conversely, translation or rotation of one or more segments or portions to bring the short walls near each other can introduce a bend or angle in the device.

It should be appreciated that translation of the inlet 610 and/or outlet 630 segments relative to the intermediate segment 620 can alter the exposed surface area of portions of the intermediate segment, such that exposure of a small surface portion (621) of the intermediate segment adjacent to long walls (611, 631) of the inlet and outlet segments and a large surface portion of the intermediate segment (622) adjacent to short walls (612, 632) of the inlet 610 and outlet 630 segments is associated with the straight configuration (600A). Similarly, translation of the inlet and/or outlet segments relative to the intermediate segment 620 can alter the exposed surface area of portions of the intermediate segment, such that exposure of a small surface portion (621) of the intermediate segment adjacent to short walls (612, 632) of the inlet and outlet segments and a large surface portion (622) of the intermediate segment adjacent to long walls (611, 631) of the inlet and outlet segments is associated with the angled or bent configuration (600B). Similar results can be achieved by rotation of the segments relative to each other, which can result in repositioning of small and large surface area portions of the intermediate segment 620 so as to be adjacent to short and long walls of the inlet 610 and outlet 630 segments. In some embodiments both translation and rotation of the segments of the exhaust directing device 600 can be implemented. It should be appreciated that appropriate translation and/or rotation between the segments can provide intermediate degrees of deflection, and can provide different directions for deflection.

As noted above, the segments of the device can be joined by interfaces (615, 625) that permit sliding/translating and/or rotating movements between the individual segments. By using segments with varying width, rotary and/or translational movement between results in the formation of a bend or angle along the long axis of the device. For example, translation of suitably angled end pieces along a central piece can permit one or both of the end pieces to lie at an angle relative to the central piece, providing an angle or bend that redirects the flow of exhaust gases through central lumen of the device. Similarly, rotation of an angled central piece relative suitably angled end pieces can bring the longer sides of these segments into alignment and generate a bend or angle that can be used for redirecting the exhaust stream.

In preferred embodiments, the intermediate portion (620) is slidably and fluidically coupled to the exhaust inlet portion (610) by a first interface (615) and the intermediate portion (620) is slidably and fluidically coupled to the outlet portion (630) by a second interface (625). Preferably, the first interface (615) and the second interface (625) are not in a perpendicular orientation relative to a long axis of the exhaust directing device (600) when the exhaust directing device (600) is in the first position (600A).

Movements of portions of an exhaust directing device 600 of the inventive concept can be generated using any suitable driver or motor. For example, when segments of an exhaust directing device of the inventive concept are to be translated relative to one another a linear actuator can be attached to adjacent segments of the device. Suitable linear actuators include linear electric motors, pneumatic actuators, hydraulic actuators, or combinations thereof. Such actuators can be mounted to either exterior or interior surfaces of the segments of the device. Alternatively, when segments of an exhaust redirecting device of the inventive concept are to be rotated relative to one another a conventional electrical motor can be used. Such a motor can, for example, be coupled to a portion of a segment of the device using a gear or belt system in order to transfer rotary motion. In some embodiments an exhaust redirecting device of the inventive concept can incorporate both linear and rotary motors.

As noted above, the relatively low temperature and energy of the exhaust gases from the jet engine of a tilt rotor aircraft permit the use of light weight (e.g. less than 5 gcm$^{-3}$, less than 4 gcm$^{-3}$, less than 3.5 gcm$^{-3}$, less than 3 gcm$^{-3}$, less than 2.5 gcm$^{-3}$, less than 2 gcm$^{-3}$) materials. Suitable materials include ceramics, polymers, graphite/resin composites, glass fiber/resin composites, light weight metals (e.g. aluminum, magnesium, titanium, steel, alloys), and combinations of these. Such materials can be used throughout, for example in portions that are in direct contact with the exhaust stream. Similarly, relatively small thicknesses (e.g. less than 5 cm, less than 4 cm, less than 3 cm, less than 2 cm, less than 1 cm, less than 0.5 cm) of such materials can be used.

Figure 7A:
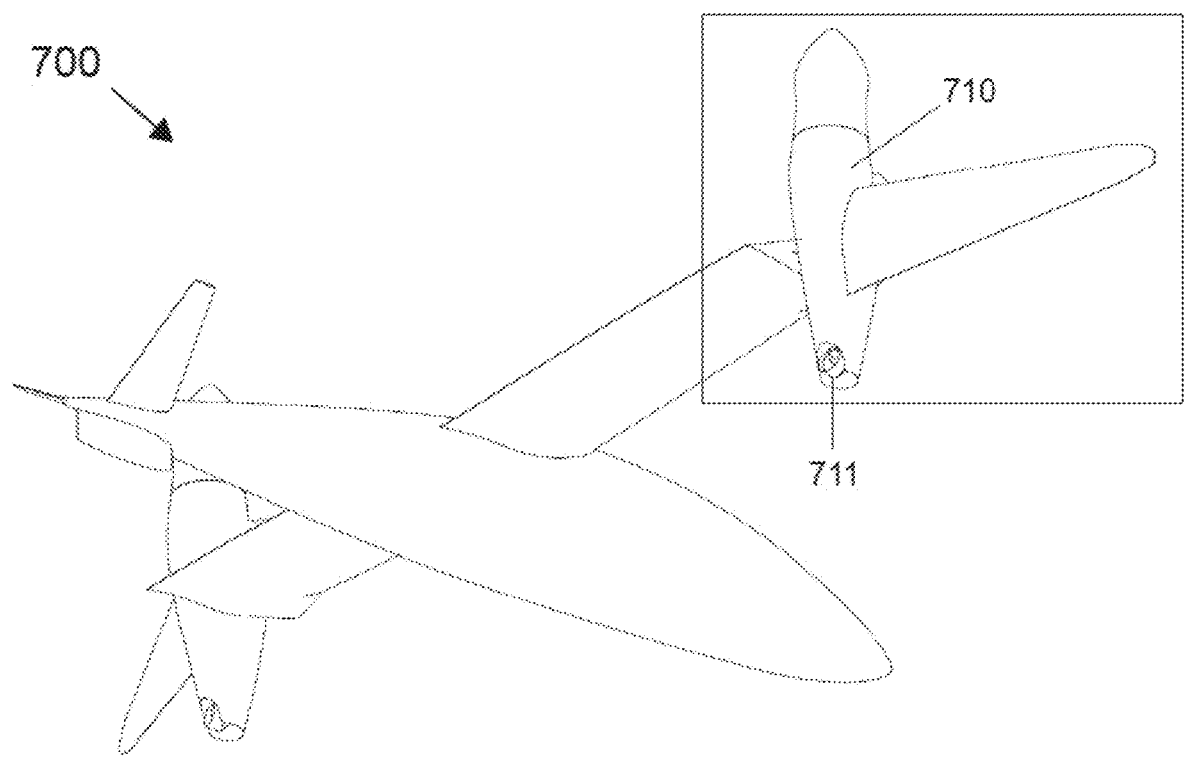
FIGS. 7A to 7D depict an exhaust directing device of the inventive concept in use in vertical and horizontal flight.
Figure 7B:
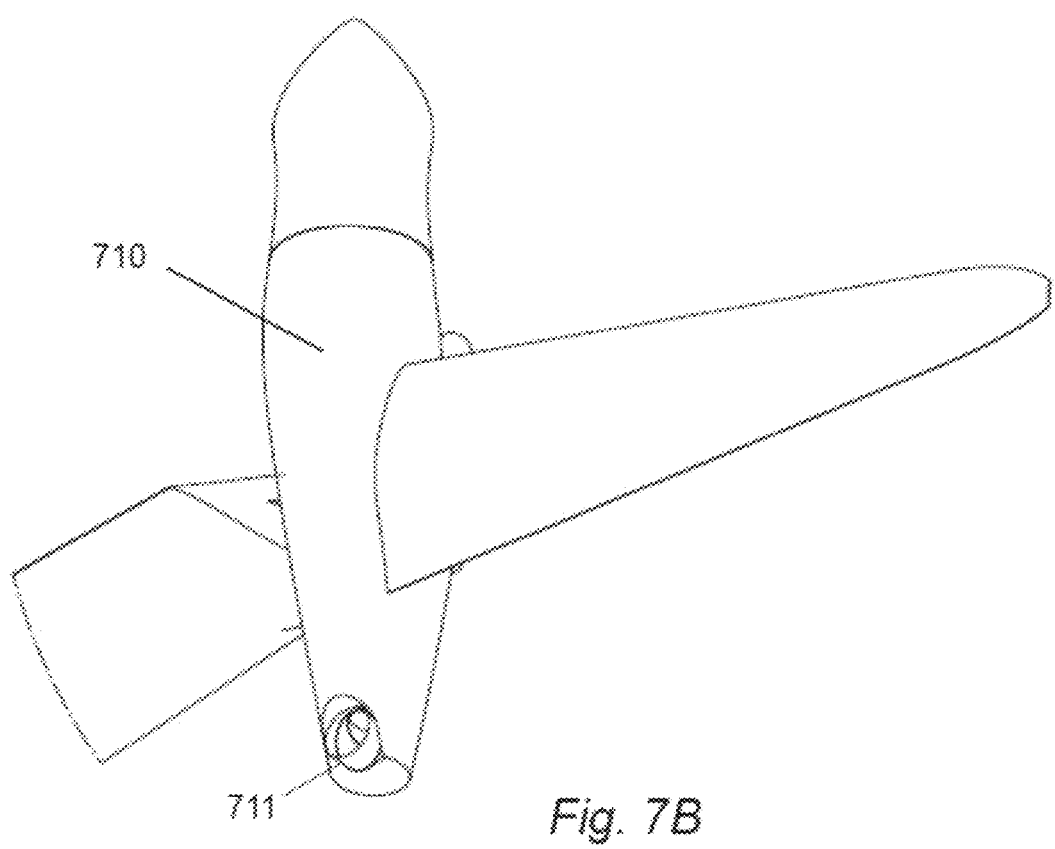
Figure 7C:
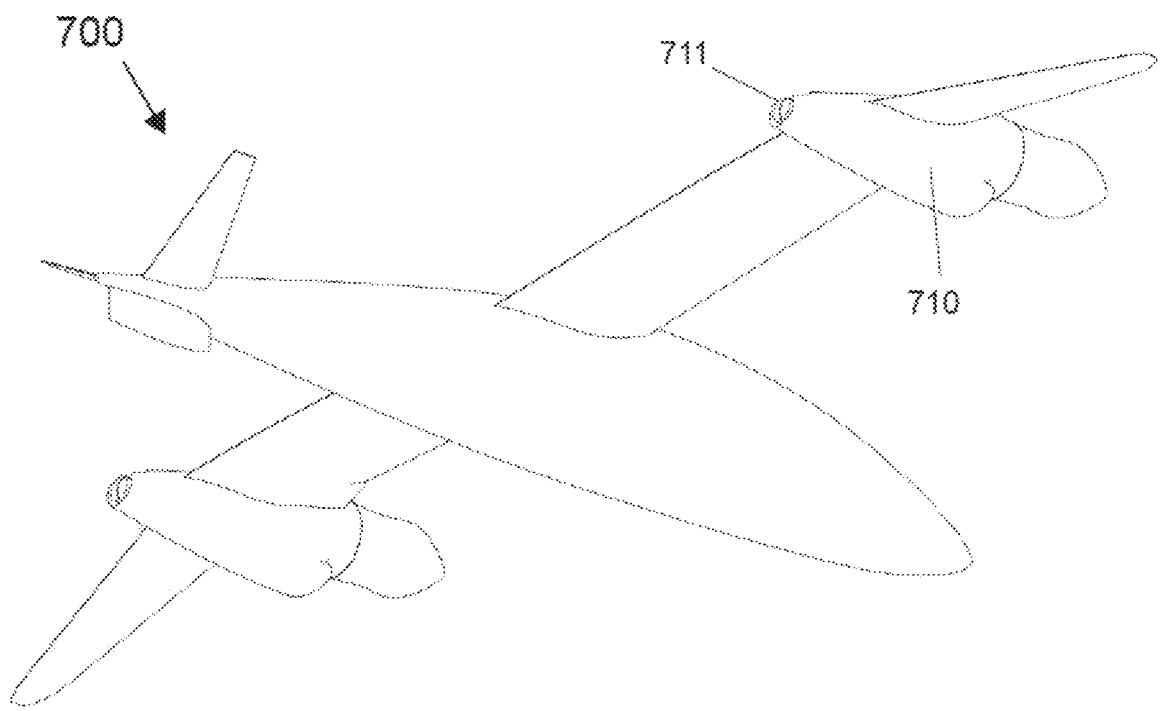
Figure 7D:
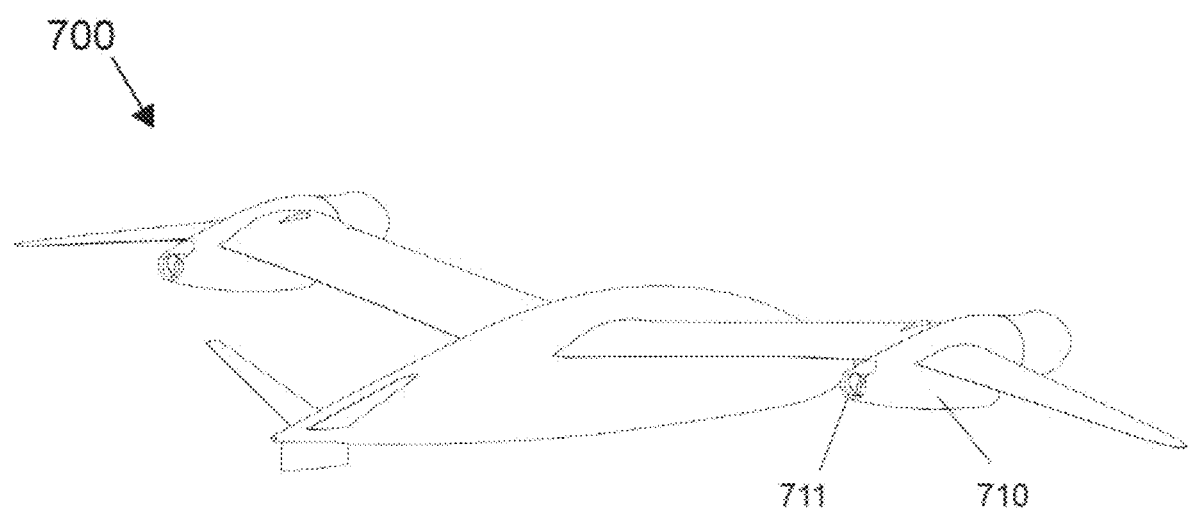

As shown in FIGS. 7A to 7D, devices and systems of the inventive concept can be used to maintain the direction of the flow of exhaust gases from a tilt rotor aircraft engine towards the rear of the aircraft 700 while a nacelle 710 of the aircraft is in either a vertical or horizontal position. FIG. 7A shows the exhaust directing device 711 in the angled or bent position while the associated nacelle 710 is in vertical position for hovering or horizontal flight, thereby directing the exhaust stream from the jet engine of the nacelle towards the rear of the aircraft. FIG. 7B provides an enlarged view of the nacelle 710, exhaust directing device 711, and a portion of the wing of the aircraft 700. FIGS. 7C and 7D show views of the same aircraft 700 configured for horizontal flight, with the nacelles 710 in a horizontal position. As shown, the exhaust directing device 711 has been reconfigured to the straight position while the associated nacelle is 710 in horizontal position, thereby continuing to direct the exhaust stream toward the rear of the aircraft 700. It should be appreciated that an exhaust directing device 711 of the inventive concept can provide intermediate configurations in order to consistently direct the exhaust stream in a desired direction during hovering, vertical flight, horizontal flight, and transitions between these states. In some embodiments an exhaust directing device 711 of the inventive concept can be used to direct the exhaust stream to enhance vertical lift and/or provide supplementary maneuvering thrust. In such embodiments exhaust directing devices in simultaneous use in different nacelles can have different configurations.

Figure 8:
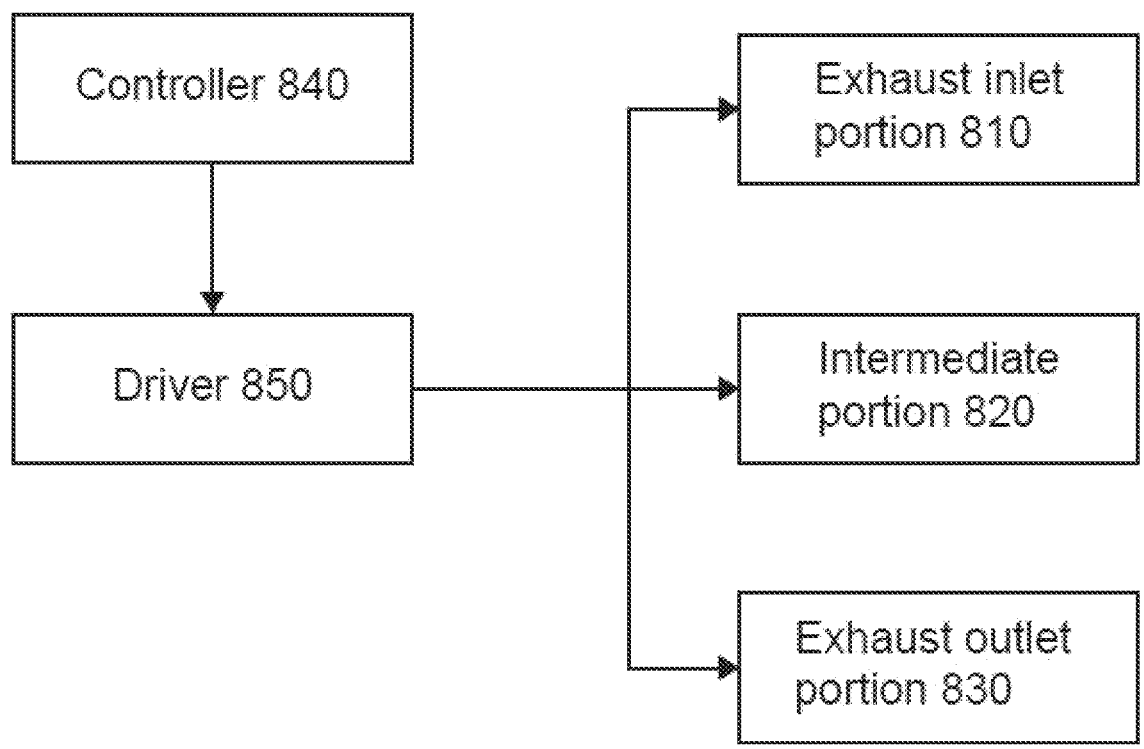
FIG. 8 provides a schematic depiction of a system of the inventive concept.

As shown in FIGS. 7A to 7D, coordination between the movements of the nacelle 710 and/or flight configuration of the tilt rotor aircraft 700 is desirable. Accordingly, as shown in FIG. 8, in some embodiments a controller 840 is provided that is in communication with one or more driver(s) 850 used to manipulate one or more segment(s) (810, 820, 830) of the exhaust directing device and thereby control its configuration. In preferred embodiments such a controller 840 is in communication with a flight control system of the tilt rotor aircraft (which can be partially or completely autonomous, piloted, or remotely piloted), and configured to automatically manipulate the exhaust redirecting device in concert with movements of the nacelles of the tilt rotor aircraft. In such embodiments implementation of devices of the inventive concept advantageously does not place an additional burden on a human pilot or automated piloting system.

As shown, such a system can include an exhaust directing device with multiple segments (810, 820, 830) as described above, along with a driving or manipulating mechanism 850 that is designed and positioned to translate and/or rotate one or more of the portions/segments of the exhaust directing device so as to move the exhaust directing device between straight and angled position. Such a system can include a controller 840 that is in electrical communication with the driver 850 and that coordinates transition of the exhaust directing device (810, 820, 830) between straight and angled positions with flight control commands for transition of the tilt rotor aircraft between vertical and horizontal flight. This can, for example, be achieved by coordinating such movement with the repositioning of a nacelle or nacelles. In some embodiments the controller 840 can receive commands from a pilot or autonomous flight control system that override such coordination and manipulate an exhaust directing system of the inventive concept to provide alternative functions, such as supplementary lifting and/or maneuvering thrust.

In some embodiments the driving or manipulating mechanism 850 is designed and positioned to rotate at least one of the exhaust inlet portion 810, the intermediate portion 820, and the outlet portion 830 of the exhaust directing device relative to a major axis of the exhaust directing device (for example, the major axis when in the straight or linear configuration). In other embodiments the driving or manipulating mechanism 850 is designed and positioned to translate at least a portion of one of the exhaust inlet portion 810 and the outlet portion 830 of the exhaust directing device relative to the intermediate portion 820. Any suitable driving or manipulating mechanism can be used. Suitable linear driving devices include pneumatic or hydraulic rams, linear motors, worm gear drives, reeled lines, and artificial muscles. Suitable rotary drivers include electric motors, which can be used in combination with gear and/or belt mechanisms. In some embodiments both linear and rotary drivers are utilized. Such driving or manipulating mechanisms can be wholly or partially located external to the exhaust directing device and/or within its interior. Although depicted as in communication with a single driver 850, such a controller 840 can be in communication with two or more drivers that are each coupled (either directly or indirectly) to one or more segments/portions (810, 820, 830) of an exhaust directing device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An exhaust direction device (600) for a tilt rotor aircraft having a nacelle tiltable from a vertical orientation in rotor borne flight to a horizontal orientation during forward flight, the exhaust directing device comprising:
   an inlet portion (610) positioned with respect to the nacelle such that orientation of the inlet portion changes with the orientation of the nacelle;
   an outlet portion (630) coupled to a nozzle assembly (640); and
   an intermediate portion (620) interposed between the inlet portion (610) and the outlet portion (630),
   wherein the intermediate portion (620) is rotatable with respect to each of the inlet portion (610) and the outlet portion (630), such that an exhaust stream exists the nozzle assembly (640) horizontally when the nacelle is oriented vertically.

2. The exhaust directing device (600) of claim 1, wherein the intermediate portion is wedge shaped.

3. The exhaust directing device device (600) of claim 1, inlet and outlet portions (610,630) are wedge-shaped.

4. The exhaust directing device (600) of claim 1, wherein at least one of the inlet (610), intermediate (620) and outlet (630) portions of the exhaust directing device (600) comprises a light weight material.

5. The exhaust directing device (600) of claim 4, wherein the light weight material is selected from the group consisting of a composite material, aluminum, magnesium, titanium, steel, and any combination thereof.

6. The exhaust directing device (600) of claim 5, wherein the light weight material has a thickness of between 0.25 cm and 5 cm.

7. A system (800) for directing exhaust from a tilt rotor aircraft having a nacelle that is tiltable from a vertical position in rotor borne flight to a horizontal position during forward flight, the system comprising:
   an exhaust directing device having (a) an inlet portion (810) in fluidic communication with an exhaust stream of the nacelle, (b) an outlet portion (830) coupled to a nozzle assembly, and (c) an intermediate portion (820) interposed between the inlet portion (810) and the outlet portion (830);
   a driver (850) configured to rotate at least one of the inlet portion (810), the intermediate portion (820), and the outlet portion (830) such that an exhaust stream nozzle assembly (640) in directions indepenedtly of orientation of the nacelle;
   a controller (840) in electrical communication with the driver, and configured to control orientation of the exhaust stream exiting the nozzle assembly.

8. The system (800) of claim 7, wherein the driver (850) comprises a motor or a linear actuator.

9. The system (800) of claim 8, wherein the linear actuator is selected from the group consisting of a linear motor, a hydraulic actuator, and a pneumatic actuator.

* * * * *

UNITED STATES PATENT AND TRADEMARK OFFICE
CERTIFICATE OF CORRECTION

PATENT NO. : 11,136,941 B2
APPLICATION NO. : 16/186139
DATED : October 5, 2021
INVENTOR(S) : Karem It is certified that error appears in the above-identified patent and that said Letters Patent is hereby corrected as shown below:

In the Claims

Column 9, Line 25, Claim 1 "An exhaust direction device" should read --An exhaust directing device--

Column 9, Line 38, Claim 1 "exhaust stream exists the" should read --exhaust stream exits the--

Column 10, Line 3, Claim 3 "directing device device (600)" should read --directing device (600)--

Column 10, Line 4, Claim 3 "claim 1, inlet and outlet" should read --claim 1, wherein each of the inlet and outlet--

Column 10, Line 29, Claim 7 "an exhaust stream nozzle" should read --an exhaust stream can exit the nozzle--

Column 10, Line 30, Claim 7 "directions independtly" should read --directions independently--

Column 10, Line 32, Claim 7 "a controller" should read --and a controller--

Signed and Sealed this
Second Day of August, 2022

Katherine Kelly Vidal
*Director of the United States Patent and Trademark Office*